Figure 1:
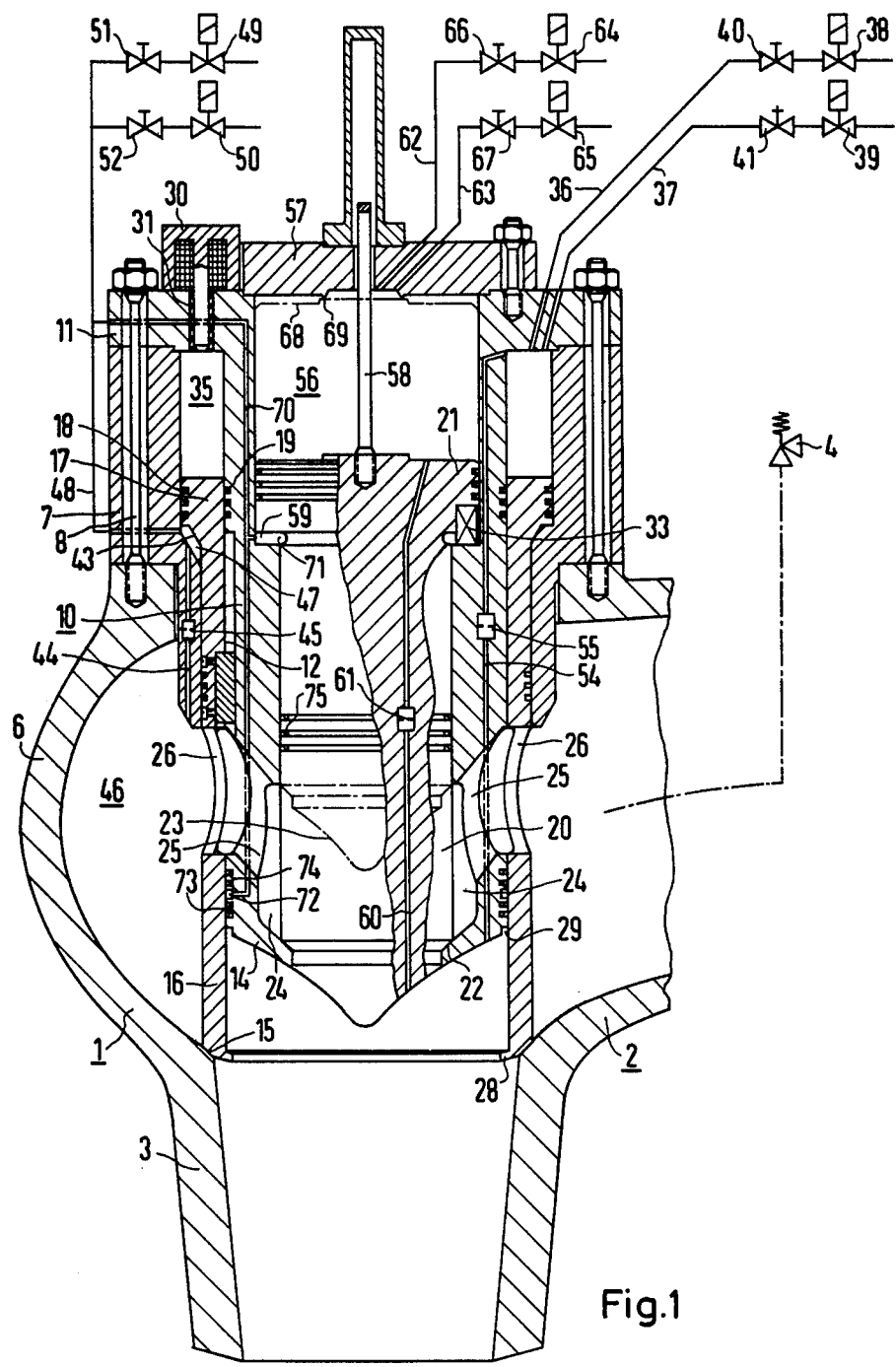

United States Patent [19]

Schabert et al.

[11] 4,092,214
[45] May 30, 1978

[54] NUCLEAR REACTOR INSTALLATION

[75] Inventors: Hans-Peter Schabert, Erlangen; Erwin Laurer, Mohrendorf near Erlangen, both of Germany

[73] Assignee: Kraftwerk Union Aktiengesellschaft, Mulheim, Germany

[21] Appl. No.: 711,471

[22] Filed: Aug. 4, 1976

[30] Foreign Application Priority Data

Aug. 13, 1975 Germany .............................. 2536199

[51] Int. Cl.² .............................................. G21C 9/00
[52] U.S. Cl. .................................. 176/38; 137/599.2; 176/65
[58] Field of Search ........................ 137/599.2, 637.2; 176/38, 87

[56] References Cited

U.S. PATENT DOCUMENTS

| 3,081,919 | 3/1963 | Samuel | 137/637.2 |
|---|---|---|---|
| 3,529,630 | 9/1970 | Podolsky | 137/630.13 |
| 3,605,808 | 9/1971 | Fisher | 137/599.2 |
| 3,631,893 | 1/1972 | Seaman | 137/630 |
| 3,734,134 | 5/1973 | Vogeli | 137/637.2 |

FOREIGN PATENT DOCUMENTS

| 2,409,867 | 4/1975 | Germany | 176/38 |
|---|---|---|---|
| 2,345,580 | 7/1975 | Germany | 176/38 |
| 1,047,150 | 12/1958 | Germany | 137/599.2 |

OTHER PUBLICATIONS

IBM Technical Disclosure Bulletin, vol. 17, No. 11 Apr. 1975, p. 3213.

Primary Examiner—Samuel W. Engle
Assistant Examiner—Ralph Palo
Attorney, Agent, or Firm—Herbert L. Lerner

[57] ABSTRACT

Nuclear reactor installation has a containment shell, a steam generator disposed in the interior of the containment shell, a live steam line extending from the steam generator through the containment shell to the exterior thereof, a fast-acting valve having a main valve seat and a movable main valve plate opening and closing on the main valve seat connecting the live steam line to the steam generator, the main valve plate being closable on the main valve seat in a pressure-dependent operation upon the occurrence of a leak in the live steam line, the valve and the line having substantially equal maximum aperture cross sections, pressure-dependent operating means for opening the main valve plate on the main valve seat at a pressure exceeding the operating pressure of the live steam line, and means for limiting the opening by the main valve plate on the main valve seat to at most about half the maximum aperture cross section. The main valve plate includes a tubular slider and an auxiliary valve plate surrounded by the tubular slider, a fixed guide member mutually sealing the tubular slider and the auxiliary valve plate, an auxiliary valve seat for the auxiliary valve plate formed in the guide member, the auxiliary valve plate being openable on the auxiliary valve seat with increasing steam pressure to provide a smaller aperture cross section.

8 Claims, 2 Drawing Figures

NUCLEAR REACTOR INSTALLATION

The invention relates to a nuclear reactor installation. More specifically, the invention relates to such a nuclear reactor installation having a containment shell, a steam generator disposed in the interior thereof, a live steam line extending from the steam generator through the containment shell to the exterior thereof, a fast-acting shut-off valve having a valve seat and a movable valve plate opening and closing on the seat connecting the live steam line to the steam generator, the valve plate being closable on the valve seat in a pressure-dependent operation upon the occurrence of a leak in the live steam line, the valve and the line having substantially equal maximum aperture cross sections. This fast-acting shut-off valve is not only supposed to serve as a shut-off or check valve but also as a safety valve which affords pressure-relief in the event of excessive pressure. For this reason, pressure-dependent operating means have been provided for opening the valve plate on the valve seat at a pressure exceeding the operating pressure of the live steam line, however, means have also been provided for limiting the opening by the valve plate on the seat to at most about half the maximum aperture cross section.

With this heretofore known valve, a distinction is automatically made between normal operation and an accident wherein, in contrast to normal operation, the entire live cross section is not to be opened as the maximum aperture cross section of the valve. By reducing the aperture cross section, the production of excessively large discharge rates during a break in the live steam line is avoided, which would otherwise cause undue or impermissible loading or stressing of the steam generator system.

It is an object of the invention to provide an improved valve of the foregoing type which assures reliable operation.

With the foregoing and other objects in view, the aforedescribed valve has a valve plate which comprises a tubular slider and an auxiliary valve plate surrounded by the tubular slider, a fixed guide member sealing the tubular slider and auxiliary valve plate with respect to each other, an auxiliary valve seat for the auxiliary valve plate formed in the guide member, the auxiliary valve plate being openable on the auxiliary valve seat with increasing steam pressure to provide a smaller aperture cross section.

In the invention according to the instant application, only the tubular slider is actuated during normal operation. The full or maximum cross section opened thereby is an annular cross section between the valve seat and the guide member. In the closed position of the valve, this annualr cross section is closed. The forces then exerted by steam pressure upon the tubular slider are advantageously small. However, even in the open position of the valve, only small forces can act upon the tubular slider because the guide member ensures stabilization.

The smaller aperture cross section in the event of the occurrence of an excessive pressure, which produces a correspondingly small discharge or outflow rate, is constructed as an additional valve seat in the guide member which is controllable with the auxiliary valve plate mechanically independently of the tubular slider. This auxiliary valve plate is set in motion only in the event of an accident. In the normal operating situation, it can therefore have no effect or influence upon the flow through the valve. On the other hand, the mode of operation thereof can also not be adversely affected or impaired by the tubular slider when the latter, in case of an accident, as desired, has gone into the closed position.

In accordance with another feature of the invention, the tubular slider is formed with openings and, in closed position of the tubular slider, the openings form an outlet for the aperture cross section of the auxiliary valve plate opened on the auxiliary valve seat. The openings can be distributed symmetrically about the periphery of the tubular slider. They should be aligned with recesses formed in the guide member if one doesn't wish to ensure by an especially large construction that an adequate aperture or passage would always be available.

In accordance with a further feature of the invention, mutually coaxially mounted pistons are provided which are operatively connected to the tube slider and the auxiliary valve plate for displacing the same in response to actuation of the pistons by steam from the live steam line. No auxiliary medium is required in this case for controlling the auxiliary valve. The actuation can be effected, advantageously, by pressure-relief. In the normal case, all sides of the piston are then subjected to the steam and the displacement of the piston is introduced by pressured-relieving one or the other side of the piston.

In accordance with an additional feature of the invention, both of the pistons are disposed adjacent the fixed guide member and are guidable therealong. Thus, only the guide member provides the support required for operating the valve because then during manufacture and assembly, only small tolerances need be maintained between guide member and pistons. In order further to attain torsion-free guidance, pistons and guide member can be provided with meshing projections, preferably with a wedge or key fastened to the respective piston, with which a groove or slot formed in the guide member is associated.

In accordance with an added feature of the invention, the fixed guide member is formed with a recess and the tubular slider is formed with an inwardly projecting edge which, in open position of the tubular slider, engages in the recess formed in the fixed guide member. The tubular slider is thereby fixed against fluttering movements which could otherwise be incited due to the steam flow through the valve. This is especially true in the case wherein the tubular slider remains in open position under the effect of a holding force. The holding force can be applied by a spring or a pawl. More specifically, in accordance with yet another feature of the invention, magnet means are provided, associated with the tubular slider, for fixing the latter in the open position thereof. Especially suited are both permanent magnets as well as electromagnets, if necessary, in combination with a resilient anchoring plate. For electromagnets, a circuit for reducing the exciter current after attaining magnet-armature retention is recommended.

In accordance with yet another feature of the invention, permanent magnet means are provided, associated with the auxiliary valve plate, for fixing the latter in closed position thereof on the auxiliary valve seat. A result thereof is that, when subjecting the valve to steam at increasing pressure such as occurs during start-up of the nuclear reactor installation or plant, the correct position or setting of the auxiliary valve plate is assured until this position is determined by the piston serving for the actuation. Furthermore, the holding force, which can, under certain conditions, be exerted also by a spring, prevents excitation of the auxiliary valve plate to vibrate due to the steam flow during normal operation.

In accordance with a concomitant feature of the invention, two groups of piston rings are mounted on the guide member for sealing the tubular slider, an annular groove is formed in the guide member between the groups of piston rings, and channel means extend through the guide member and are connected to the annular groove for venting the latter.

Other features which are considered as characteristic for the invention are set forth in the appended claims.

Although the invention is illustrated and described herein as embodied in nuclear reactor installation, it is nevertheless not intended to be limited to the details shown, since various modifications and structural changes may be made therein without departing from the spirit of the invention and within the scope and range of equivalents of the claims.

Figure 2:
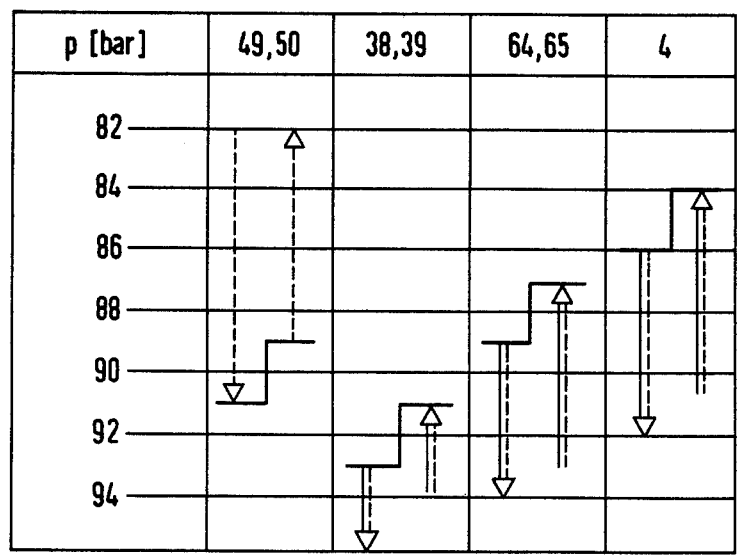

The construction and method of operation of the invention, however, together with additional objects and advantages thereof will be best understood from the following description of specific embodiments when read in connection with the accompanying drawings, in which:

FIG. 1 is a partly schematic fragmentary view of a nuclear reactor installation according to the invention showing a fast-acting shut-off valve thereof; and FIG. 2 is a schedule or plan of the control system of the valve as a function of live steam pressure in the line in which the valve is connected.

Referring now to the drawing and first, particularly, to FIG. 1 thereof, there is shown part of a nuclear reactor installation with a pressurized water reactor of 1200 MWe, for example, of which only a fast-acting shut-off valve 1 disposed in a live-steam line in the interior of the containment shell of the reactor is shown in detail, seated advantageously directly on a non-illustrated steam generator belonging to this nuclear reactor installation.

The fast-acting shut-off valve 1 has a nominal width or diameter of 700 mm. It forms an elbow for a live-steam line 2 which extends upwardly with a pipe section 3 in vertical direction out of the upper side of the steam generator. Behind or downstream from the valve 1, the live-steam line extends substantially horizontally. It leads to a non-illustrated turbine which is associated with a safety valve 4.

The housing 6 of the fast-acting shut-off valve 1, which is welded to the pipe section 3, has a tubular attachment or neck 7 which is stressed in compression thereon with clamping or tightening bolts 8. The clamping bolts 8 simultaneously therewith fasten to the housing 6 a guide member 10 which extends with a flange 11 thereof above or beyond the attachment 7, as viewed in FIG. 1.

The guide member 10 has a cylinder 12 at the outside thereof below the flange 11. The end surface 14 thereof facing away from the flange 11, and located opposite a valve seat 15, is pointed or tapered. The cylinder 12 carries, on the outside thereof, a tubular slider 16 which cooperates at one end thereof with the valve seat 15. At the other end of the tubular slider 16, a piston 17 is seated and is sealed with respect to the attachment 7 and the guide member 10 by piston rings 18 and 19.

An auxiliary valve plate 20 slides coaxially to the tube slider 16 and the piston 17 thereof along the axis of the guide member 10, and has a piston 21 at the end thereof facing away from the valve seat 15. The auxiliary valve plate 20 lies, in the illustrated closed position thereof in FIG. 1, on a valve seat 22 which is formed by the lower end 14 of the guide member 10. The open position of the auxiliary valve 20 is shown in phantom at 23. In the latter position, as is apparent, a passage 24 from the pipe section 3 is freed or opened through recesses 25 formed in the guide member 10 which, in the closed position of the tube slider 16, are aligned with openings 26 formed in the tube slider 16.

The tube slider 16 has a projecting edge or rim 28 at the end thereof facing away from the piston 17. In the open position of the tube slider 16, the projecting edge or rim 28 engages in a recess 29 formed in the guide member 10 and matching the shape of the edge or rim 28, so that the tube slider 16 is fixed. In this regard, a holding force of 400 kilopond (kp), for example, is exerted by an electromagnet 30 which is threadedly secured to the flange 11 of the guide member 10 and, through a bushing or sleeve 31 of nonmagnetic material, exerts a holding force on the piston 17.

In the piston 21 of the auxiliary valve plate 20, several permanent magnets 33, such as four, for example, are disposed. The permanent magnets 33 hold the piston 21 and, thereby, the auxiliary valve plate 20 in the closed position thereof with a force of 600 kp altogether, for example.

The piston 17 slides in a ring cylinder 35 which is defined by the inner surface of the attachment 7 and the outer surface of the guide member 10. This cylinder 35 is connected through two redundantly disposed outlet lines 36 and 37 to controllable valves 38 and 39, in front of which or upstream of which, shut-off or check valves 40 and 41 are connected.

The underside 43 of the piston 11, as viewed in FIG. 1, is connected through a channel 44, which extends through the attachment 7 and contains a throttle 45, to the inner space 46 of the valve 1.

The appertaining lower part 47 of the cylinder 35 is connected, through a second control line 48, which can be a double structure for reasons of redundancy, to two control valves 49 and 50, before which or upstream of which shut-off or check valves 51 and 52 are connected. In addition, the cylinder 35 is connected through a channel 54, extending through the guide member 10 and containing a throttle 55, to the pipe section 3.

The piston 21 slides in a cylinder 56 formed by the guide member 10 and closed with a cover 57. A rod 58 of the piston 21 projects through the cover 57 and serves as a position indicator. The cylinder 56 is connected, on the side 59 of the piston 21 facing away from the valve seat 22, through a channel 60 extending through the auxiliary valve plate 20 and having a throttle 61 therein, to the pipe section 3 leading to the valve 1. It is, furthermore, pressure-relievable through two redundantly constructed outlet lines 62 and 63 upon the opening of control valves 64 and 65, disposed therein and preceded by shut-off or check valves 66 and 67. In the upper end position of the piston 21 shown in phantom at 68, the piston 21 closes a valve seat 69 leading to the lines 62 and 63.

A further channel 70 in the guide member 10 connects the space 71 below the piston 21 to the valves 49 and 50. Furthermore, this channel 70 leads to an annular groove 72 formed in the guide member 10 between two groups 73 and 74 of piston rings. The piston rings 73 and 74 seal the tube slider 16 with respect to the guide member 10 and, with the annular groove 72, assurance is provided that in the closed positon of the tube slider 16, no steam can penetrate into the part of the valve 1 lying behind or downstream of the valve seat 15. Piston rings 75 serve for sealing the auxiliary valve plate 20 with respect to the guide member 10 and simultaneously ensure the guidance of the auxiliary valve plate 20.

In FIG. 2, the position or setting and displacement as a function of steam pressure in the pipe section 3 or in the live-steam line 2 behind or downstream of the valve 1 for the three valve groups 49, 50; 38, 39 and 64, 65 as well as for the safety valve 4, are shown, Stream pressure $p$ is given in bar. The broken lines in FIG. 2 represent the presure range wherein the control valves, during fast-acting shut-off of the valve 1, are opened. The double arrow with a solid and a broken line applies to control valves which, in the respective pressure range, both during operation as well as during fast-acting shut-off, are opened.

From the schedule of FIG. 2 it may be concluded that the valve 1 is so controllable through pressure-relief that it opens or closes the full throughput or maximum aperture cross section in normal operation with the tube slider 16. When the throughput or aperture cross section is closed or blocked and with increasing pressure (between 87 and 89 bar), the auxiliary valve plate 20 opens a reduced or diminished outlet or aperture cross section.

There are claimed:

1. In a nuclear reactor installation having a containment shell, a steam generator disposed in the interior of the containment shell, a live steam line extending from the steam generator through the containment shell to the exterior thereof, a fast-acting shut-off valve having a main valve seat and a movable main valve plate opening and closing on the main valve seat connecting the live steam line to the steam generator, the main valve plate being closable on the main valve seat upon the occurrence of a leak in the live steam line, the valve and the line having substantially equal maximum aperture cross sections, pressure-dependent operating means for opening the main valve plate on the main valve seat at a pressure exceeding the operating pressure of the live steam line, and means for limiting the opening by the main valve plate on the main valve seat to at most about half the maximum aperture cross section, the main valve plate comprising a tubular slider and an auxiliary valve plate surrounded by said tubular slider, a fixed guide member mutually sealing said tubular slider and auxiliary valve plate, an auxiliary valve seat for said auxiliary valve plate formed in said guide member, said auxiliary valve plate being openable on said auxiliary valve seat with increasing steam pressure to provide a smaller aperture cross section.

2. Nuclear reactor installation according to claim 1 wherein said tubular slider is formed with openings and, in a closed position of said tubular slider, said openings form an outlet for the aperture cross section of said auxiliary valve plate opened on said auxiliary valve seat.

3. Nuclear reactor installation according to claim 1 including mutually coaxially mounted pistons operatively connected to said tube slider and said auxiliary valve plate for displacing the same in response to actuation of said pistons by steam from said live steam line.

4. Nuclear reactor installation according to claim 3 wherein both said pistons are disposed adjacent to said fixed guide member and are guidable therealong.

5. Nuclear reactor installation according to claim 2 wherein said fixed guide member is formed with a recess and said tubular slider is formed with an inwardly projecting edge which, in an open position of said tubular slider, engages in said recess formed in said fixed guide member.

6. Nuclear reactor installation according to claim 5 including magnet means associated with said tubular slider for fixing the latter in said open position thereof.

7. Nuclear reactor installation according to claim 1 including permanent magnet means associated with said auxiliary valve plate for fixing the latter in closed position thereon on said auxiliary valve seat.

8. Nuclear reactor installation according to claim 1 comprising two groups of piston rings mounted on said guide member for sealing said tubular slider, an annular groove formed in said guide member between said groups of piston rings, and channel means extending through said guide member and connected to said annular groove for venting the latter.

* * * * *